May 16, 1950 W. J. MEAD 2,507,862
QUICK-FREEZE, QUICK-THAW DEVICE FOR FOODSTUFFS
Filed Jan. 10, 1945 2 Sheets-Sheet 1
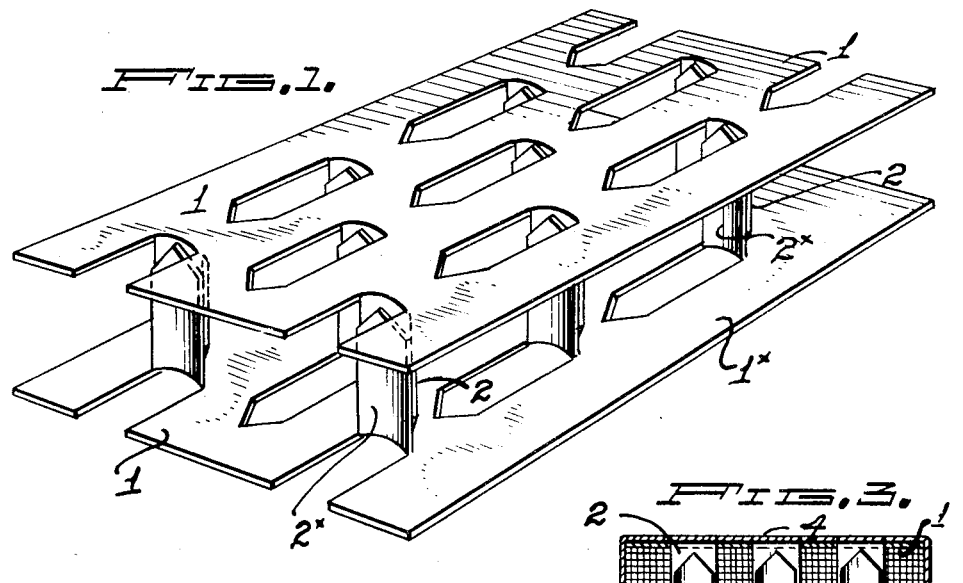
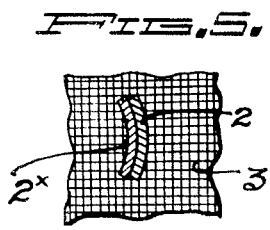
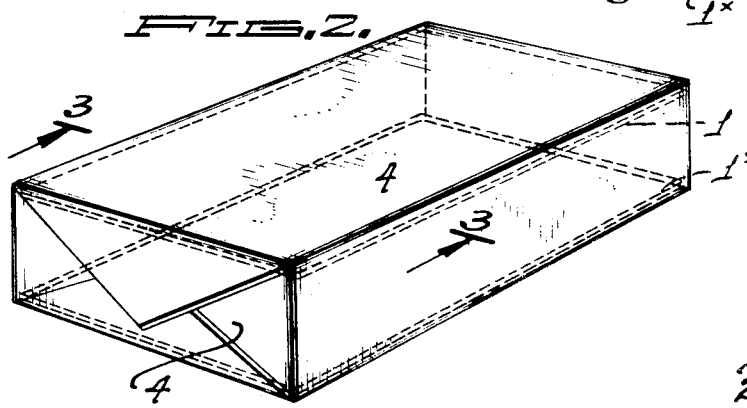
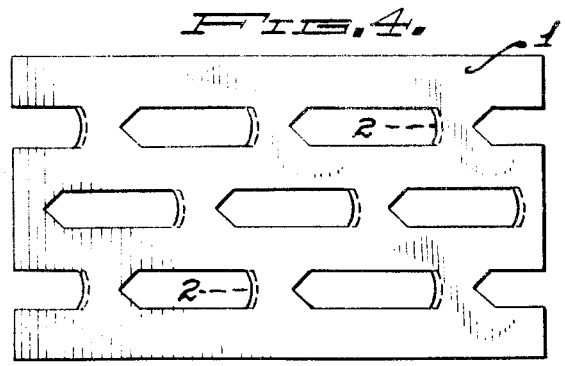

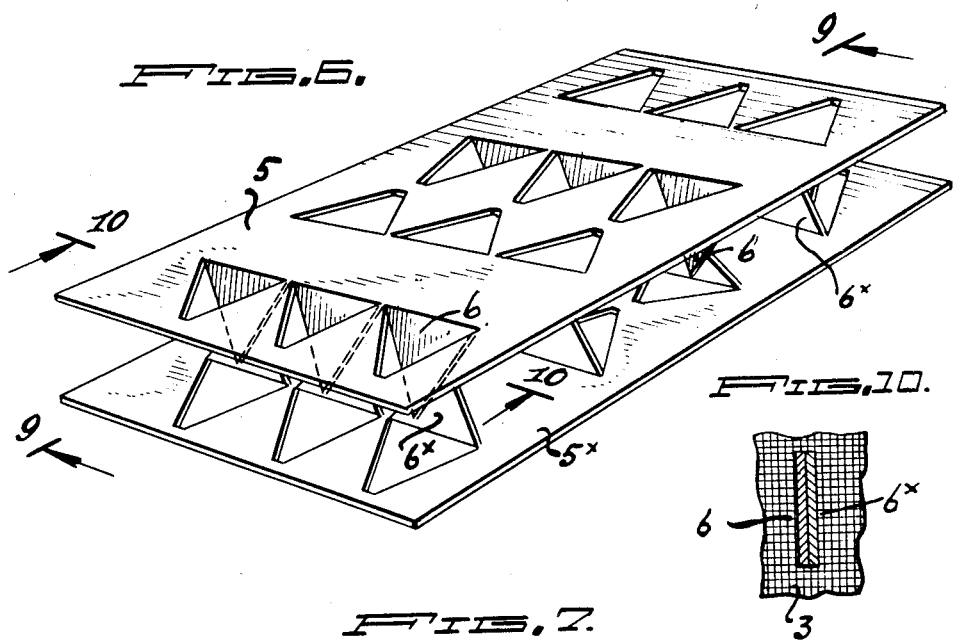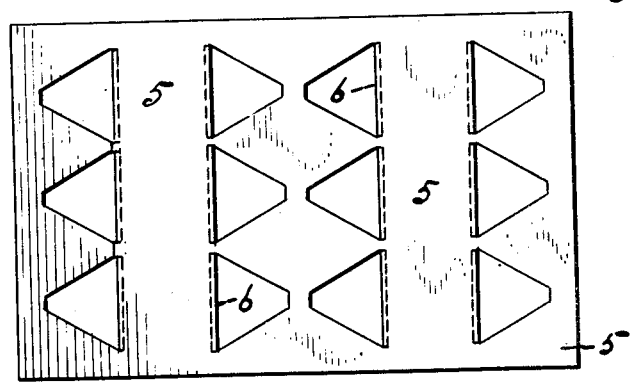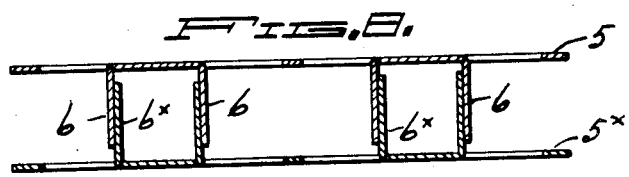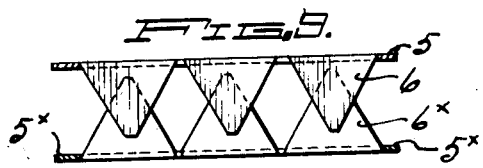

Patented May 16, 1950

2,507,862

UNITED STATES PATENT OFFICE 2,507,862

QUICK-FREEZE, QUICK-THAW DEVICE FOR FOODSTUFFS

Warren J. Mead, Belmont, Mass., assignor to Reynolds Metals Co., Richmond, Va., a corporation of Delaware Application January 10, 1945, Serial No. 572,112

1 Claim. (Cl. 257—263)

This invention relates to means accompanying a package of food to be frozen, and to be thawed and used in customary manner after freezing, which will hasten the freezing operation and which also will shorten the time of thawing.

In the preparation of foodstuffs for freezing, as customarily employed, the vegetables, meats, fruits or cooked foods, to be frozen, are formed into package units by being placed in metal freezing containers generally lined with wax paper, and are subjected to a selected freezing process under low temperature. When the freezing has been completed the units are removed from the freezing containers and boxed or wrapped for distribution and retail sale.

With many foodstuffs the time of freezing, as well as thawing, is relatively slow, due to their poor heat conduction characteristics. This factor is important in the time, and hence cost, of the freezing operation. Such frozen foods resist thawing at room temperature and for proper preparation for cooking they should be thawed at or about room temperature. This last factor makes practical means for quick, but normal-temperature, thawing of importance to the housewife.

By my invention the time of freezing and the thawing time at normal temperatures are greatly reduced by simple and inexpensive means which will accompany the package of frozen food from the time of freezing to the completion of the thawing step.

The invention will be described with reference to the accompanying drawings, in which—

Fig. 1 is a perspective view showing the two thermal conductor members which in conjunction form an embodiment of the invention.

Fig. 2 is a schematic view of a wrapped package within which will be disposed my device.

Fig. 3 is a transverse section on the line 3—3, Fig. 2, the hatching indicating a food-stuff to be frozen, or after freezing.

Fig. 4 is a plan view of the structure shown in Fig. 1.

Fig. 5 is a fragmentary sectional plan view on the line 5—5, Fig. 3.

Fig. 6 is a perspective view showing a second form of my device.

Fig. 7 is a plan view of the structure shown in Fig. 6.

Fig. 8 is a narrowed side elevation of the structure shown in Fig. 6 and

Fig. 9 is a narrowed end elevation of the same.

Fig. 10 is a fragmentary vertical section through a foodstuff and two of the metallic conductor teeth.

Referring to Figs. 1 to 6 of the drawings, my device consists of either a single metallic toothed sheet, or two of said sheets, 1, 1x, which will be formed preferably of light guage aluminum, because of the high thermal conductivity of that metal and its general acceptance for food contact. In the drawings two of the two sheet thermal conductors are shown in conjunction.

A plurality of elongated pointed cuts are made in each metal sheet to bound the sides and pointed ends of conductor teeth 2, 2x. The dies for cutting the sheet in the formation of the teeth may be designed to both cut, transversely curve, and angularly bend, the teeth, the latter extending substantially at right angles to their carrying sheets. The curved formation of the teeth will enable a lighter guage of metal sheet than otherwise.

In the packaging of foods for freezing one sheet alone may be used. For example, the lower toothed thermal sheet 1x may be placed in the forming container, the teeth 2x extending upwardly and the foodstuff poured (as in the case of cooked foodstuffs and fruits and vegetables in small aggregates), or pressed into position, to fill the container. The package thus formed may then be placed in the freezer.

The heat will more rapidly be withdrawn from the interior of the foodstuff, and the time of freezing very greatly reduced, because the teeth will readily conduit the interior heat to the thermal sheet from which the interior and surface heat will be taken up by the freezing apparatus. In fact, my device enables relatively quick freezing of foods generally by the use of ordinary "chill" rooms, or "hardening" rooms such as employed for hardening ice cream products, and my device renders extreme low temperatures, with consequent high cost in apparatus and operation, quite unnecessary in the greater number of cases.

It will be understood that the teeth or interior conductors carried by and projected from each thermal sheet may be of widely different form and arrangement. As an illustration, I have shown in Figs. 6 to 9 inclusive, a second form of my device. The same light guage thermal sheets preferably of aluminum, are used as shown at 5, 5x. The teeth 6, 6x, however, are flat-sided and wedge-shaped. As in the preceding form of my device, the teeth of the two thermal sheets 5, 5x are in face contact. While such arrangement is desirable, it is not essential, and the teeth of one sheet may be separated from those of the second sheet. Also in most cases a single thermal sheet with projected heat conducting members will be sufficient.

When the freezing operation is completed the frozen foodstuff unit, with its thermal sheet or sheets as a part thereof, may be boxed, or wrapped as indicated as indicated in Fig. 2, and then may be distributed for retail sale in the customary manner. The user will expose the unboxed or unwrapped unit to ordinary room temperature. The heat will be quickly taken up by the aluminum thermal sheet and conducted to the interior of the frozen food. Thawing will rapidly result as compared with the slow thawing with frozen foods packaged according to present practice.

Having described my invention, what I claim and desire to secure by Letters Patent is as follows:

A quick-freeze, quick-thaw device adapted for use with and in packages of food to be frozen, and consisting of two metallic plates, each being formed with a plurality of integral projected spurs or teeth extending at substantially right angles to the plate, whereby the plates may be arranged with the teeth of one plate opposed to those of the second plate for projection of the teeth into the body of food to be frozen for the metallic conduction of heat from the interior of the body to the plates, and reverse action as to conduction of heat in the thawing of said body.

WARREN J. MEAD.

REFERENCES CITED

The following references are of record in the file of this patent:

UNITED STATES PATENTS

| Number | Name | Date |
|---|---|---|
| 267,535 | Hurd | Nov. 14, 1882 |
| 858,258 | Briscoe et al. | June 25, 1907 |
| 1,983,549 | Krackowizer | Dec. 11, 1934 |
| 2,011,289 | Klyce | Aug. 13, 1935 |
| 2,013,896 | Pennington | Sept. 10, 1935 |
| 2,075,472 | Schwary et al. | Mar. 30, 1937 |
| 2,129,572 | Finnegan | Sept. 6, 1938 |